Aug. 19, 1969  R. G. KUHNE  3,461,632
LIGHTWEIGHT CELLULAR STRUCTURAL MATERIAL
Filed Oct. 18, 1965
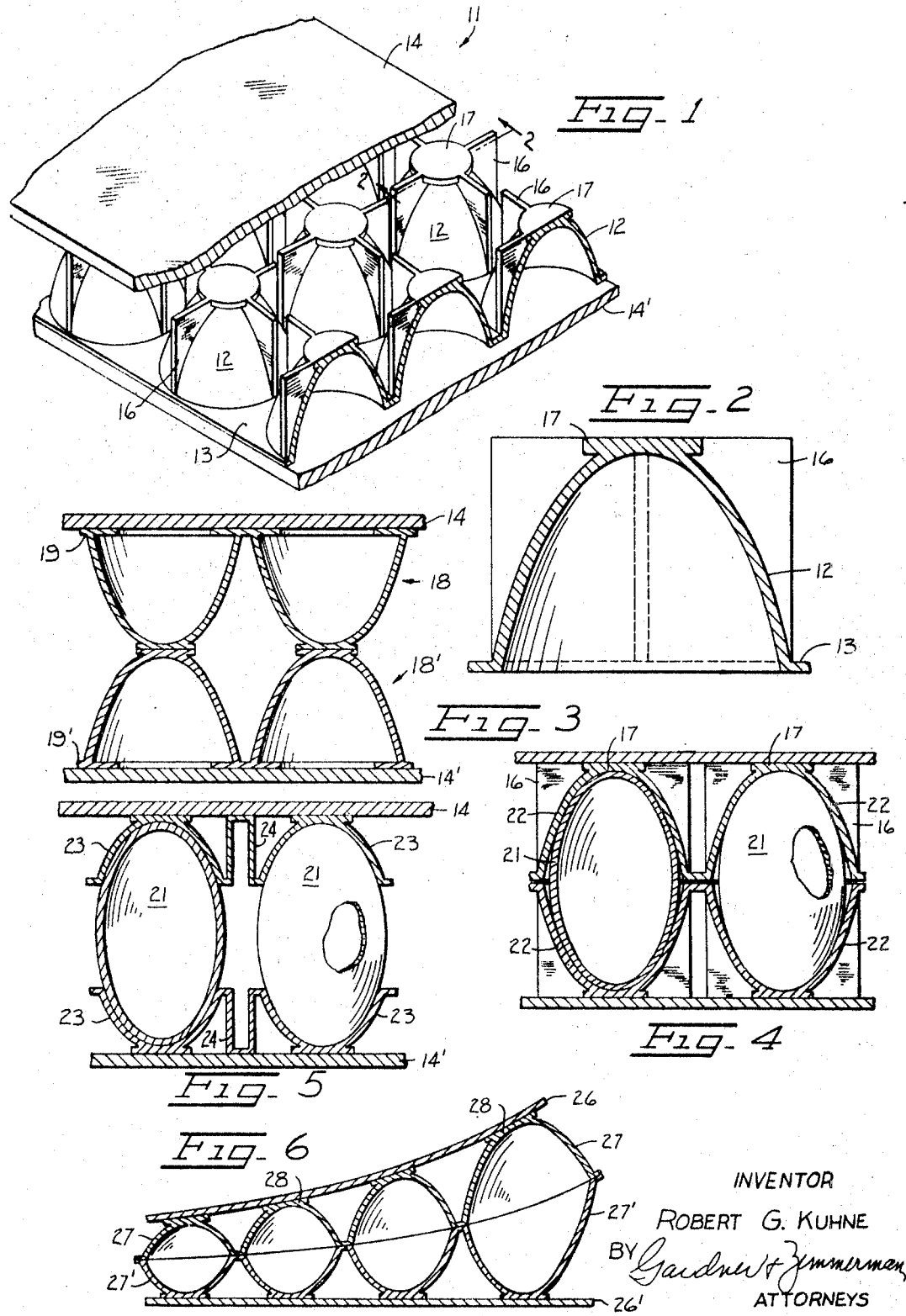
INVENTOR
ROBERT G. KUHNE
BY Gardner & Zimmerman
ATTORNEYS

United States Patent Office 3,461,632
Patented Aug. 19, 1969

3,461,632
LIGHTWEIGHT CELLULAR STRUCTURAL MATERIAL
Robert G. Kuhne, 41880 Covington Drive, Fremont, Calif. 94538
Filed Oct. 18, 1965, Ser. No. 497,135
Int. Cl. E04c 2/34, 1/06; E04b 2/28
U.S. Cl. 52—615   10 Claims

ABSTRACT OF THE DISCLOSURE

A lightweight cellular structural material is described in which the hoop stresses caused in each cell by a compressive load on the material are equal throughout the axial length of such cell whereby the structural material can withstand without rupturing a much greater compressive load than structural materials having conventional cells. Each cell has a curvature substantially that of the surface of revolution obtained by the rotation of a catenary curve on its own axis, and web members extend axially of each cell between it and a facing sheet disposed in engagement with the vertices of the cells. The members are integrally connected to their associated cells and terminate at their upper edges at the facing sheet to distribute compressive loads on the facing sheet evenly over the surface of the cells.

---

This invention relates to lightweight cellular structural materials and more particularly to such a material having an optimum strength to weight ratio.

In many environments and for many uses, it is becoming increasingly important that structural materials be of a lightweight and yet retain high strength characteristics. For example, this is particularly true with respect to materials used in the fabrication of vehicles designed for atmospheric and space flights, such as airplanes, rockets, satellites, etc.

One general type of such material is commonly known as cellular material and comprises a lamina of curved cells, e.g., hemispherical caps, sandwiched between facing plates or sheets. Use of this kind of lightweight material is especially desirable in those instances in which a light material is necessary but such material is to be subjected to compressive forces or impacts. However, the strength to weight ratio of the cellular materials now available is not optimum. One reason for this is that internal stresses tend to build up within the curved cells of the material when it is subjected to compression, with a resulting rupturing or undesired deformation of such cells. To overcome this, the walls of the cells have been made relatively thick to withstand these internal stresses. This adds substantially to the weight of the material. Another objection to this type of material is that, in general, plates of it are not conducive to being curved to a desired shape. Furthermore, the facing sheets often become unbonded from the cellular lamina when the material is subjected to shearing forces.

Accordingly, it is an object of the present invention to provide a lightweight cellular structural material having an optimum strength to weight ratio.

Another object of the invention is to provide such a lightweight cellular structural material which is highly versatile and can be designed to satisfy many different requirements.

A further object is to provide such a structural material having a strong bond between the cellular lamina and the facing sheets.

Still another object of the invention is to provide a cellular material which can be curved to a desired shape without affecting its structural integrity.

A still further object of the invention is to provide such a cellular structural material especially adapted for marine uses.

To effect these objects, the invention broadly comprises a cellular structural material in which the cells have in cross-section a catenary curve shape. A catenary curve is the curve assumed by a flexible, uniform cable or chain which is suspended from its ends and which carries no load except it own weight. This type of curve is characterized by the weight load being uniformly distributed all along the curve, and the horizontal component of stress at all points of the curve being constant.

The invention possesses other objects and features of advantages, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to such drawings:

FIGURE 1 is a perspective, broken away view of one preferred embodiment of the invention;

FIGURE 2 is a cross-sectional view of one of the cells of the structural material of FIGURE 1 taken on a plane indicated by the line 2—2;

FIGURE 3 is a cross-sectional view through another cellular structural material embodiment of the invention having a different cell orientation;

FIGURE 4 is a cross-sectional view of another embodiment of the invention depicting a closed cell and saddle arrangement incorporating the invention;

FIGURE 5 is also a cross-sectional vew of another preferred embodiment of the invention similar to that embodiment depicted in FIGURE 4 but which is especially adapted to be curved into various shapes; and FIGURE 6 is a cross-sectional view of still another embodiment of the invention in which the exterior facing plates diverge from one another.

With reference to FIGURES 1 and 2, there is shown a cellular structural material 11 in which the cells or shells 12 have in cross-section a catenary curve shape. More particularly, each is substantially defined by the surface of revolution obtained upon rotation of a catenary curve on its axis. It has been found that when cells of such a configuration are subjected to a compressive load along the axis of the catenary, the hoop stresses caused in the cell are equal throughout the axial length of the cell. Because of such, a catenary cell can withstand a much greater compressive load than cells of other configurations without rupturing. Thus, the material thickness of each catenary cell can be thinner to support a given load than if the cell was of some other curved configuration. A cellular structural material having catenary cells, therefore, has a higher strength to weight ratio than a material having any other type of curved cell.

Furthermore, the catenary curve can be varied to a great extent. This can be readily appreciated by visualizing the suspension of a cable of a given length between two points which are made to move toward and away from one another. Thus, it is seen that the cells of the invention can be made with a low curvature, i.e., almost flat, or with a very high curvature, i.e., very narrow. While it is preferred that the cells have an intermediate configuration such as shown in the drawing, this feature of the catenary permits design of a structural material of the invention to satisfy almost any design criteria. That is, by varying the curvature of the catenary cells, the parameters of the structural material such as cell density, material width, strength per unit area, and weight, can be varied over a great range.

Considering now the embodiment of the invention of FIGURES 1 and 2 in greater detail, the catenary cells 12 are formed integrally with and protrude from a lamina 13. This lamina 13 is sandwiched between load transmitting facing members such as the facing sheets 14 and 14′. In order to illustrate the cells 12, the upper facing sheet 14 is depicted broken away. However, it is to be undertood that it extends over the cells.

As mentioned before, the catenary curve is characterized by the fact that the weight of the cable or similar flexible object forming the curve is uniformly distributed along the length of the cable. It has been found that when a compressive load is placed on a cell of the invention, this load is similarly distributed uniformly along the surface of the cell. In the embodiment of the invention shown in FIGURES 1 and 2, this inherent advantageous feature of the invention is aided by the provision of means for evenly distributing compressive loads over the surface. More particularly, a plurality of webs 16 extend radially on each cell. These webs are integrally connected to their associated cells and terminate at their upper edges at the face sheet 14. Any load applied to the sheet 14 is thus transmitted from such sheet by the webs to the cell along the axial length of the cell's exterior surface. This distribution of the load over the surface of each of the catenary cells enhances the strength characteristics of the material.

To assure a tight bond between the cells 12 and the upper face sheet 14, each cell is provided at its vertex with a disc member 17. The discs 17 provide a large surface area in contact with the upper plate 14 at which a suitable bonding agent such as an adhesive can be applied. Because of this large surface area, a bond of high integrity can be obtained between the plate 14 and the lamina 13.

It is to be realized that it is only practical to include the webs 16 and the discs 17 on the cells of the lamina 13, if the lamina 13 is fabricated of plastic such as by vacuum molding. In this regard, it should be noted that with the catenary cell configuration of the invention, plastic materials can be used in many instances in which in the past it has been necessary to use metals for the desired strength. However, in those instances when it is necessary or desirable to use metals because of the design criteria, other means for distributing the load over the surface of the cells and providing a large bonding area can be provided. One of such means will be discussed later in connection with another embodiment of the invention.

In some instances, it is desired that structural material be curved rather than planar. For example, if the material is to be used in the fabrication of piping, it must have a cylindric configuration. The structural material of the invention lends itself to being fabricated in different curved shapes. The lamina 13 can be bent to or formed in the desired shape, and then the facing sheets, also with such shape, bonded thereto. If the lamina is to have a fairly high curvature with the cells 12 facing inwardly, the webs 16 on adjacent cells can be offset so that such a curvature is possible without them contacting and binding. Alternatively, some means other than the web arrangement can be provided to distribute loads over the exterior surfaces of the cells.

It is to be noted that the cells 12 are oriented between the facing sheets 14 and 14′ such that compressive forces perpendicular to the facing sheets will be parallel to the axes of the cells. This orientation is preferred to assure optimum strength of the material and the desired equal hoop strength throughout each cell.

In the embodiment of the invention of FIGURES 1 and 2, the cells 12 are shown aligned in a rectangular arrangement. However, it should be appreciated that other cell alignments are contemplated as being within the scope of the invention. For example, the cells of adjacent lines thereof can be offset, or the cells can be aligned along curved lines such as arcs. In this manner, a cellular material of the invention can be designed to resist particular forces without bending or buckling.

Another embodiment of the invention in which two layers 18 and 18′ of catenary cells are sandwiched between facing sheets 14 and 14′ is depicted in FIGURE 3. While it is contemplated that the two layers could be oriented with the cell vertices of each layer being outermost, in this embodiment the two layers 18 and 18′ of cells are integrally joined together at the vertices of the cells. Thus, they are oriented with the lamina sheets 19 and 19′ of the layers 18 and 18′ respectively, facing outwardly for bonding to the facing sheets. As shown, the openings at the base of the cells in the lamina sheets have a smaller diameter than the base of such cells. In this manner, an extended surface area is provided on each lamina for securance to its associated facing sheet to ensure a tight bond to the facing sheet.

Desirably, the cells 18 and 18′ have the same catenary curvature. This assures that the hoop stresses created in one layer of the cells is equal to that in the other layer. One layer of the cells is, therefore, equally as strong as the other, and the strength to weight ratio of the cellular material is optimum. It is to be noted that if the material from which the cells 18 and 18′ are made is somewhat elastic, this embodiment will permit the cellular material to flex under a load if desired. More particularly, the cells 18 can move somewhat obliquely with respect to the cells 18′ because of the constricted portion at which the cells are joined. This allows the desired flexure.

In some uses of constructional material, such as in the fabrication of boat hulls, it is desirable that the material have a high buoyancy. Two embodiments of a cellular structural material of the invention having such a high buoyancy are depicted in FIGURES 4 and 5. In these embodiments, the catenary cells are in the form of hollow, hermetically healed, closed cells 21. Such cells in cross-section have a configuration corresponding to two joined catenary curves having opposed vertices and a common axis. Desirably, these two catenary curves are congruent so that any hoop stresses generated in the cells will be equal throughout the entire length of the cell.

In order to join together adjacent closed cells, means such as the saddle members 22 of FIGURE 4 or the saddle members 23 of FIGURE 5 are provided. With reference to FIGURE 4, it is seen that each of the saddle members 22 comprises a lamina having concavities therein which conform to the exterior curvature of the cells 21 adjacent their vertices. The closed cells fit within such concavities and the saddle members thereby hold the closed cells in position. As shown, each of the saddle members 22 extends to substantially the midplane of the cells 21 and, therefore, the cells 21 are almost completely enclosed by such saddle members. It is to be noted that while not so depicted the saddle members can completely enclose the cells 21 and be bonded to one another, as well as to the exterior cell surface, if desired.

Besides holding the cells in position, the saddle members distribute loads on the structural material over the entire surfaces of the cells. Thus, they enhance the strength characteristics of the cellular material. In this regard, it is to be noted that webs, such as the webs 16 in the embodiment of FIGURES 1 and 2, can be provided on the saddle members for strengthening and load distribution purposes if desired.

Because both of the saddle members 22 extend to the midplane of the cells 21, it should be apparent by referring to the drawing that if such saddle members are of a somewhat flexible material, they can flex somewhat between the adjacent cells to permit the sandwiched material to be curved to a desired shape. Furthermore, it is to be noted that each of the saddle members is provided with bonding discs at the vertices of the concavities therein to assure a tight bond to the facing sheets 14 and 14′ in the manner previously discussed.

The saddle members 23 of the embodiment of FIGURE 5 also have concavities therein into which the closed cells 21 fit. However, these saddle members do not extend to the midplane of the closed cells. Thus, with this embodiment a closer spacing of adjacent cells is possible. In order to permit a curved structural material to be made with this embodiment, each of these saddle members 23 is provided with annular flexible folds 24 between the cells. Such folds 24 allow the spacing of the vertices of adjacent cells to be varied as is necessary for the desired curving. Furthermore, these folds act in the manner of the webs 16 in distributing load to the surfaces of the cells 21, and the upper planar surfaces of such folds provide additional surface area for bonding the saddle members to the face plates 14 and 14'.

It is often desirable that the face sheets of a structural material not be parallel to one another, but rather diverge in some manner. Cellular materials, in general, do not lend themselves to this type of configuration. However, with the instant invention such a configuration can easily be provided. One such construction is depicted in FIGURE 6 wherein the top facing sheet 26 is shown curving away from the lower facing sheet 26'. Sandwiched between such facing sheets, are two layers 27 and 27' of lamina having catenary cells. More particularly, the cells of each of the lamina have a cross-section corresponding to that of a catenary curve formed by a flexible, uniform cable suspended at its ends from points which are not in the same plane. Desirably, the curvature of each of the cells is that of a catenary which is suspended from points on the surface midway between the facing sheets 26 and 26', and with its axis perpendicular to the facing sheet adjacent its vertex. With such a cell curvature the structural material is designed to withstand loads acting perpendicularly to each of the facing sheets at any point thereon. Discs 28 similar to the discs 17 are provided on each of the cells at the point it is bonded to its associated facing plate to assure a good sound bond. Preferably the two layers 27 and 27' of cells are also bonded together at their interfaces.

It should be appreciated that the variations in the structural material embodiments previously described can also be incorporated into this embodiment. For example, webs could be provided between the cells and the facing sheets to effect a uniform distribution of loads on the material. In addition the closed cells 21 can be filled with liquids, solids, or gases if desired for such purposes as storage or buoyancy.

What is claimed is:

1. A lightweight cellular structural material, comprising a layer of a plurality of adjacent curved cells arranged in side by side relationship, each of said cells having a cell axis and each of which in cross-section having a substantially catenary curvature in all cross-sections thereof containing the cell axis and each constituting means to support a component of expected load along the axis of said catenary curvature with the meridian and hoop stresses caused in each of said cells by said component of load being equal throughout the catenary axial length of said cell, a pair of load transmitting members having surfaces secured to and positioned on opposite sides of said layer of cells and extending generally perpendicular with respect to said cell axes to transmit a component of said load to said cells in a direction parallel to the axes of said cells.

2. The lightweight cellular structural material of claim 1 wherein said load transmitting members are facing sheets, and said cells have bonding members at their points of abutment with said facing sheets providing an extended surface area for the joining of said cells to said facing sheets.

3. In a lightweight cellular structural material, a layer of a plurality of adjacent curved cells arranged in side by side relationship, each of which in cross-section has a substantially catenary curvature and each of which is oriented to support a component of expected load along the axis of said catenary curvature, said layer of curved cells being sandwiched between load transmitting facing members which are positioned with respect to said cells to transmit a component of said expected load to said cells in a direction parallel to the axis of said cells, one of said facing members engaging said cells substantially at the vertices thereof, and web members extending axially of each of said cells between said cells and said facing member, said web members being in engagement with said cells and said facing member to evenly distribute loads on said facing member to the exterior surfaces of said cells.

4. The lightweight cellular structural material of claim 1 wherein each of said curved cells is a substantially closed cell having in cross-section a curvature of two joined substantially catenary curves with opposed vertices and a common axis.

5. The lightweight cellular structural material of claim 1 wherein adjacent curved cells are joined together at their vertex ends by a saddle member having concavities conforming to the exterior curvature of said cells adjacent said vertices and into which said vertex ends are fitted.

6. The lightweight cellular structural material of claim 5 wherein said saddle member is expandable transversely to said cells between said adjacent cells to permit the transverse spacing between said vertex ends to be varied whereby said structural material can be curved without causing undue stresses in said cells.

7. The lightweight cellular structural material of claim 1 wherein the load transmitting facing members diverge form one another and said curved cells are oriented therebetween with their axes perpendicular to the facing member adjacent their vertices.

8. A lightweight cellular structural material comprising a plurality of closed, substantially hermetically sealed, hollow curved surface cells, a first saddle member for joining together said cells having concavities therein conforming to the exterior curvature of said cells adjacent a first point on the exterior periphery thereof and into which said cells are fitted at said point, and a second saddle member for joining together said cells having concavities therein conforming to the exterior curvature of said cells adjacent a second point on the exterior thereof opposed to said first point and into which said cells are fitted at said second point.

9. The lightweight cellular structural material of claim 8 wherein each of said saddle members is expandable between said cells transversely to said cells to permit the transverse spacing between said cells to be varied whereby said material can be curved without causing undue stresses on said cells.

10. The lightweight cellular structural material of claim 8 wherein said cells and saddle members are sandwiched between load transmitting facing members.

References Cited

UNITED STATES PATENTS

| | | | |
|---|---|---|---|
| 601,036 | 3/1898 | Camp | 52—480 |
| 2,391,997 | 1/1946 | Noble | 52—615 X |
| 2,988,959 | 6/1961 | Pelkey et al. | 52—615 X |
| 3,011,602 | 12/1961 | Ensrud et al. | 161—131 |
| 3,024,879 | 3/1962 | Kandra | 52—613 |
| 3,108,924 | 10/1963 | Adie | 52—615 X |
| 3,025,935 | 3/1962 | Ensrud et al. | 52—613 |
| 3,071,216 | 1/1963 | Jones et al. | 161—68 X |
| 3,142,599 | 7/1964 | Chavannes | 161—131 X |
| 3,151,712 | 10/1964 | Jackson | 52—615 |
| 2,360,285 | 10/1944 | Sherman | 52—86 |

FOREIGN PATENTS

| | | |
|---|---|---|
| 1,206,081 | 8/1959 | France. |

DENNIS L. TAYLOR, Primary Examiner

U.S. Cl. X.R.

161—68, 127